United States Patent [19]

Lewis

[11] Patent Number: 5,675,710
[45] Date of Patent: Oct. 7, 1997

[54] METHOD AND APPARATUS FOR TRAINING A TEXT CLASSIFIER

[75] Inventor: David Dolan Lewis, Summit, N.J.

[73] Assignee: Lucent Technologies, Inc., Murray Hill, N.J.

[21] Appl. No.: 484,436

[22] Filed: Jun. 7, 1995

[51] Int. Cl.[6] .................................................. G06F 17/30
[52] U.S. Cl. ...................... 395/10; 364/419.19; 395/934
[58] Field of Search ............................ 395/10, 600, 613; 364/419.19, 419.07; 382/159, 229

[56] References Cited

U.S. PATENT DOCUMENTS

| | | | |
|---|---|---|---|
| 4,839,853 | 6/1989 | Deerwester et al. | |
| 5,371,807 | 12/1994 | Register et al. | 382/159 |
| 5,404,295 | 4/1995 | Katz et al. | 364/419.19 |
| 5,418,946 | 5/1995 | Mori | 395/600 |
| 5,463,773 | 10/1995 | Sakakibara et al. | 395/600 |
| 5,488,725 | 1/1996 | Turtle et al. | 395/600 |
| 5,526,407 | 6/1996 | Russell et al. | 379/89 |

OTHER PUBLICATIONS

Donna Harman. "Relevance feedback and other query modification techniques" In William B. Frakes and Ricardo Baeza–Yates, editors, Information Retrieval: Data Structures and Algorithms, pp. 241–263. Prentice Hall, Englewood Cliffs, NJ, 1992.

Chris Buckley, Gerard Salton, and James Allan. "The effect of adding relevance information in a relevance feedback environment." In W. Bruce Croft and C. J. van Rijsbergen, editors, SIGIR 94: Proceedings of the Seventeenth Annual International ACM–SIGIR Conference on Research and Development in Information Retrieval, pp. 292–300, London, 1994. Springer–Verlag.

Edward Fox, Gary Nunn, and Whay Lee, "Coefficients for Combining Concept Clsasses in a Collection", 11th International Conferences on Research and Development in Information Retrieval, pp. 291–307, Grenoble, France, Jun. 13–15, 1988.

Chris Buckley, Gerard Salton, James Allan, and Amit Singhal. "Automatic Query Expansion Using {SMART}: {TREC–3}," in D. K. Harman, editor, The Third Text Retrieval Conference (TREC–3), Gaithersburg, MD, 1995. U.S. Dept. of Commerce, National Institute of Standards and Technology. 1995.

David Hull. "Improving text retrieval for the routing problem using latent semantic indexing". In W. Bruce Croft and C. J. van Rijsbergen, editors, SIGIR 94: Proceedings of the Seventeenth Annual International ACM–SIGIR Conference on Research and Development in Information Retrieval, pp. 282–291, London, 1994. Springer–Verlag.

(List continued on next page.)

Primary Examiner—Robert W. Downs
Attorney, Agent, or Firm—J. M. Weinick

[57] ABSTRACT

A method and apparatus for training a text classifier is disclosed. A supervised learning system and an annotation system are operated cooperatively to produce a classification vector which can be used to classify documents with respect to a defined class. The annotation system automatically annotates documents with a degree of relevance annotation to produce machine annotated data. The degree of relevance annotation represents the degree to which the document belongs to the defined class. This machine annotated data is used as input to the supervised learning system. In addition to the machine annotated data, the supervised learning system can also receive manually annotated data and/or a user request. The machine annotated data, along with the manually annotated data and/or the user request, are used by the supervised learning system to produce a classification vector. In one embodiment, the supervised learning system comprises a relevance feedback mechanism. The relevance feedback mechanism is operated cooperatively with the annotation system for multiple iterations until a classification vector of acceptable accuracy is produced. The classification vector produced by the invention is the result of a combination of supervised and unsupervised learning.

29 Claims, 3 Drawing Sheets

OTHER PUBLICATIONS

David A. Evans and Robert G. Lefferts. "Design and evaluation of the CLARIT-TREC-2 system". In D. K. Harman, editor, *The Second Text Retrieval Conference (TREC-2)*, pp. 137-150, Gaithersburg, MD, Mar. 1994. U.S. Dept. of Commerce, National Institute of Standards and Technology. NIST Special Publication 500-215.

Carolyn J. Crouch, Donald B. Crouch, and Krishna R. Nareddy. "The Automatic Generation of Extended Queries." In Jean-Luc Vidick, editor, *Thirteenth Annual International ACM SIGIR Conference on Research and Development in Information Retrieval*, pp. 369-383, New York, 1990. Association for Computing Machinery.

W. B. Croft and D. J. Harper. "Using Probabilistic Models of Document Retrieval Without Relevance Feedback." *Journal of Documentation*, pp. 285-295, 35(4), 1979.

Harold Borko and Myrna Bernick. "Automatic document classification." *Journal of the Association for Computing Machinery*, pp. 151-161, 1963.

David D. Lewis. "An evaluation of phrasal and clustered representations on a text categorization task." In *Fifteenth Annual International ACM SIGIR Conference on Research and Development in Information Retrieval*, pp. 37-50, 1992.

Peter Willett. "Recent trends in hierarchic document clustering: A critical review." *Information Processing and Management*, 24(5):577-598, 1988.

Susan T. Dumais. "Latent semantic indexing (lsi) and trec-2." In Donna Harman, editor, *The Second Text Retrieval Conference (TREC-2)*, Gaithersburg, MD 20899, 1994. National Institute of Standards and Technology.

Wm. S. Cooper, Aitao Chen, and Frederic C. Gey. "Full text retrieval based on probabilistic equations with coefficients fitted by logistic regression." In D. K. Harman, editor, *The Second Text Retrieval Conference (TREC-2)*, pp. 57-65, Gaithersburg, MD, Mar. 1994. U.S. Dept. of Commerce, National Institute of Standards and Technology. NIST Special Publication 500-215.

Chris Buckley, James Allan and Gerard Salton. "Automatic routing and ad-hoc retrieval using SMART:TREC-2." In D. K. Harman, editor, *The Second Text Retrieval Conference (TREC-2)*, pp. 45-55, Gaithersburg, MD, Mar. 1994. U.S. Dept. of Commerce, National Institute of Standards and Technology. NIST Special Publication 500-215.

David D. Lewis and William A. Gale. "A sequential algorithm for training text classifiers." In W. Bruce Croft and C. J. van Rijsbengen, editors, *SIGIR 94: Proceedings of the Seventeenth Annual International ACM-SIGIR Conference on Research and Development in Information Retrieval*, pp. 3-12, London, 1994. Springer-Verlag.

Gerard Salton and Chris Buckley. "Improving retrieval performance by relevance feedback." *Journal of the American Society for Information Science*, 41(4):288-297, 1990.

F. Esposito, et al., "Empirical Learning Methods for Digitized Document Recognition: An Integrated Approach to Inductive Generalization," 6th Conf. on Artificial Intelligence Applications, vol. 1, pp. 37-45. May 1990.

M.S. Register and N. Kannan, "A Hybrid Architecture for Text Classification," Proc. 1992 IEEE Int'l. Conf. on Tools with Artificial Intelligence, pp. 286-292. Nov. 1992.

Y. Sakakibara, et al., "Text Classification and Keyword Extraction by Learning Decision Trees," Proc. 9th Conf. on Artificial Intelligence for Applications, p. 466. Mar. 1996.

J. Farkas, "Neural Networks and Document Classification," 1993 Canadian Conf. on Electrical and Computer Engineering, vol. 1, pp. 1-4. Sep. 1993.

F. Crestani, "Comparing Neural and Probabilistic Relevance Feedback in an Interactive Information Retrieval System," 1994 IEEE Int'l. Conf. on Neural Networks, vol. 5, pp. 3426-3430. Jun. 1994.

METHOD AND APPARATUS FOR TRAINING A TEXT CLASSIFIER

FIELD OF THE INVENTION

The present invention relates generally to computerized text classification. More particularly, the present invention relates to the combined supervised and unsupervised learning of text classifiers.

BACKGROUND OF THE INVENTION

The amount and variety of data stored on-line is growing at a rapid rate. This is particularly true for natural language text in its many forms (news articles, memos, electronic mail, repair reports, etc.). While there are many potential benefits of computer access to this data, they cannot be realized unless documents useful under particular circumstances can be distinguished from ones which are not useful.

An important technique in on-line text processing is text classification, which is the sorting of documents into meaningful groups. A variety of text classification systems are currently in use. Text retrieval systems attempt to separate documents from a text database into two groups: those which are relevant to a user query and those which are not. Text routing systems, or filtering systems, direct documents from an incoming stream of documents to relevant users. Text categorization systems sort documents into two or more designated classes. Text classification can be applied to documents which are purely textual, as well as documents which contain both text and other forms of data.

Text classification is sometimes done manually, by having human beings decide what group each document should go into. Such a technique is often too expensive to be practical, so machines for classifying text, and the methods of classification, have become of considerable interest. Such machines are generally programmed digital computers, and are called classifiers. Classifiers are of great importance to text processing.

For purposes of this discussion, consider a classifier which is programmed to distinguish between the class of relevant documents and the class of non-relevant documents. In order for such a classifier to be effective, it requires knowledge about the structure of relevant and non-relevant documents. Such knowledge can be manually programmed into a classifier, but this requires considerable time and expertise, given the complexity of language.

A variety of machine learning techniques have been developed to automatically train classifiers. The most common automated technique for training a classifier is called supervised learning. In such a system, the classifier is trained using documents which have been classified manually. Such manual classification requires a user to analyze a set of documents, and to decide which documents are relevant and which are not relevant. The user will then label the reviewed documents as relevant, or not relevant. These labels are called annotations. A document which has such a label assigned to it is called an annotated document. When the annotations are determined by a user, the documents are referred to as manually annotated documents.

Thus, in supervised learning, the classifier is provided with manually annotated documents which are used as training data. The classifier uses the training data to learn the structure of documents which fall within certain classes. For example, the classifier may employ a statistical procedure which will produce a statistical model of the structure of the relevant and non-relevant documents. This statistical model may then be used to classify documents which have not been annotated.

One supervised learning technique which has been widely applied to text classification is called relevance feedback. In relevance feedback, a user provides a request, which is a specification of the attributes which a document belonging to a class of interest is likely to have. The request typically contains words likely to occur in documents belonging to the class, but may also contain other identifiers such as subject categories, author names, publication dates, associated formatted data, etc. This request is then used as a query to retrieve documents from a document collection. The user may then review the retrieved documents and annotate (i.e. label) a subset of the documents as relevant to the request, and annotate another subset of the documents as not relevant to the request. The relevance feedback mechanism reformulates the query based upon these manually annotated documents. Terms or expressions which occur in the relevant documents are emphasized in the reformulated query. Similarly, terms or expressions which occur in the non-relevant documents are de-emphasized in the reformulated query. The effect of such a query reformulation is to move the query in the direction of the relevant documents and away from the non-relevant documents. An example of such a relevance feedback method is the Rocchio algorithm for relevance feedback. See, Donna Harman, "Relevance Feedback And Other Query Modification Techniques," in William B. Frakes and Ricardo Baeza-Yates, editors, *Information Retrieval: Data Structures and Algorithms*, pages 241–263, Prentice Hall, Englewood Cliffs, N.J., 1992. The more documents which are reviewed and manually annotated by the user, the more accurate the resulting query. However, the act of manually annotating documents is time consuming and thus expensive.

Since supervised learning is expensive in terms of user effort, unsupervised learning has also been used to train classifiers. Unlike supervised learning methods, unsupervised learning does not require manually annotated training data. Instead, these methods attempt to detect patterns that are inherent in a body of text, and produce a statistical model of that inherent structure. Since the data used to train the classifier with these methods is not annotated, there is no user indication as to a particular desired structure.

The most common approach to applying unsupervised learning in text classification is to apply unsupervised learning to an entire document collection. This attempts to uncover a simpler structure of the entire collection of documents. Variations of this technique have been used. For example, unsupervised learning can be used to reveal the underlying structure of words or phrases in the documents. It may be used to reveal an underlying structure of the documents as a whole by grouping the documents into related clusters. Combination of these techniques may also be used in which supervised learning is applied to both words and documents.

These existing techniques, which apply unsupervised learning to an entire document collection have not provided much improvement to text retrieval effectiveness. One reason is that there are many different underlying structures that can be found in a body of text, and only some of those structures will be useful in any particular text classification task. Since there is no user indication as to the desired structure, it is unlikely that a useful structure will be found. It is unlikely that purely unsupervised learning will be effective in information retrieval in the near future.

There have been some attempts to combine supervised and unsupervised learning. In one such attempt, supervised learning is used to train a classifier to distinguish documents which belong to some defined class from documents which do not belong to the class. The trained classifier is then applied to a document collection in order to identify a subset of documents in the collection which are most likely to belong to the class. An unsupervised learning method is then applied to the identified subset to produce a model of the underlying structure of the subset. Finally, a second round of supervised learning is applied to this model. For example, the unsupervised learning method could form clusters of documents. The second round of unsupervised learning could then train a classifier to distinguish between clusters of documents rather than between individual documents.

This approach limits the set of documents to which unsupervised learning is applied, so that it is more likely that structures reflecting the desired distinction into class members will be found. This approach has yielded somewhat better results than unsupervised learning applied to the entire data collection, but is still imperfect. The model of the underlying structure, which is identified during unsupervised learning is unpredictable and cannot be adjusted to suit the nature of a particular text collection and classification problem. Further, the process is complex, requiring at least two algorithms, (one for supervised learning and one for unsupervised learning) and multiple processing phases.

Another attempt at combining supervised and unsupervised learning is to automatically annotate documents. This approach first trains a classifier with manually annotated documents, using a supervised learning system. The trained classifier is then applied to a document collection in order to identify a small subset of highly ranked documents. This small set of highly ranked documents is assumed to belong to the defined set and the documents in the set are then automatically annotated (i.e. labeled) by the system as belonging to the defined class. These documents which are automatically annotated by the system are called machine annotated documents. These machine annotated documents, along with the original manually annotated documents, are used as training data during a second iteration of supervised learning to re-train the classifier to produce an improved classifier.

This method has worked when a high quality request and a document collection rich in relevant documents combine to ensure that the documents ranked highly by the initial classifier have a very high probability of belonging to the class. Since it cannot be know in advance that this will be the case, assuming that the highly ranked documents belong to the class is an imperfect strategy.

In the last described method, a certain number of highly ranked documents are automatically annotated as being relevant. The remaining documents are not annotated at all. This approach is limited in that it only takes into consideration a small number of documents during the supervised learning phase. In addition, those documents which are machine annotated are annotated as entirely relevant. There is no mechanism to attach a weight, representing the degree to which a document is relevant, to the annotation.

SUMMARY OF THE INVENTION

The present invention provides a method and apparatus for training a classifier using a combination of supervised and unsupervised learning. It improves on the prior art techniques by allowing documents to be automatically annotated as being partially relevant and partially not relevant. This is achieved by automatically annotating documents with a degree of relevance. This technique allows the use of the entire document collection to train the classifier, with each document contributing to the newly produced classifier based upon its degree of relevance.

In accordance with one embodiment, the invention calculates a degree of relevance for each non-manually annotated document in a collection and automatically annotates the documents with the degree of relevance, thus creating a set of machine annotated documents. These machine annotated documents are then used to train a classifier, using a supervised learning system. In addition, the supervised learning system can also use manually annotated documents and/or a user request in combination with the machine annotated data to improve the accuracy of the resulting classifier.

These and other advantages of the invention will be apparent to those of ordinary skill in the art by reference to the following detailed description and accompanying drawings.

DETAILED DESCRIPTION

1. System Architecture

As used herein, the term computer includes any device or machine capable of accepting data, applying prescribed processes to the data, and supplying the results of the processes.

Figure 1:
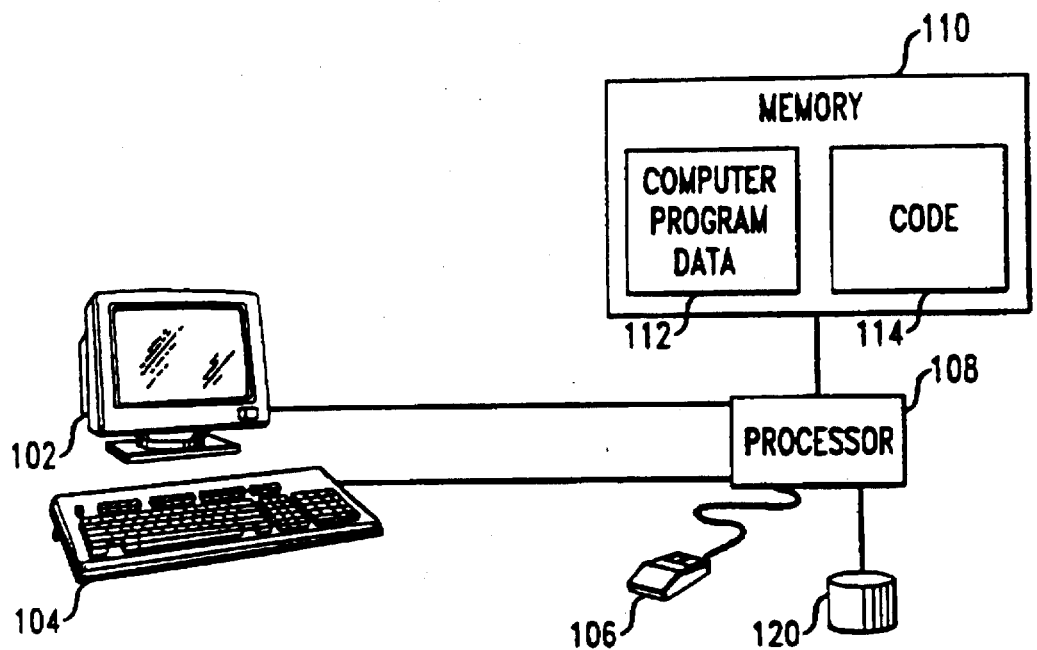
FIG. 1 shows a schematic of the components of a computer system which can be configured to implement the present invention.

The functions of the present invention are preferably performed by a programmed digital computer of the type which is well know in the art, an example of which is shown in FIG. 1. FIG. 1 shows a computer system 100 which comprises a display monitor 102, a textual input device such as a computer keyboard 104, a graphical input device such as a mouse 106, a computer processor 108, a memory unit 110, and a non-volatile storage device such as a disk drive 120. The memory unit 110 includes a storage area 112 for the storage of, for example, computer program code, and a storage area 114 for the storage of data. The computer processor 108 is connected to the display monitor 102, the memory unit 110, the non-volatile storage device 120, the keyboard 104, and the mouse 106. The external storage device 120 may be used for the storage of data and computer program code. The computer processor 108 executes the computer program code which is stored in the memory unit 110 in storage area 112. During execution, the processor may access data in storage space 114 in the memory unit 110, and may access data stored in the non-volatile storage device 120. The computer system 100 may suitably be any one of the types which are well known in the art such as a mainframe computer, a minicomputer, a workstation, or a personal computer.

Figure 2:
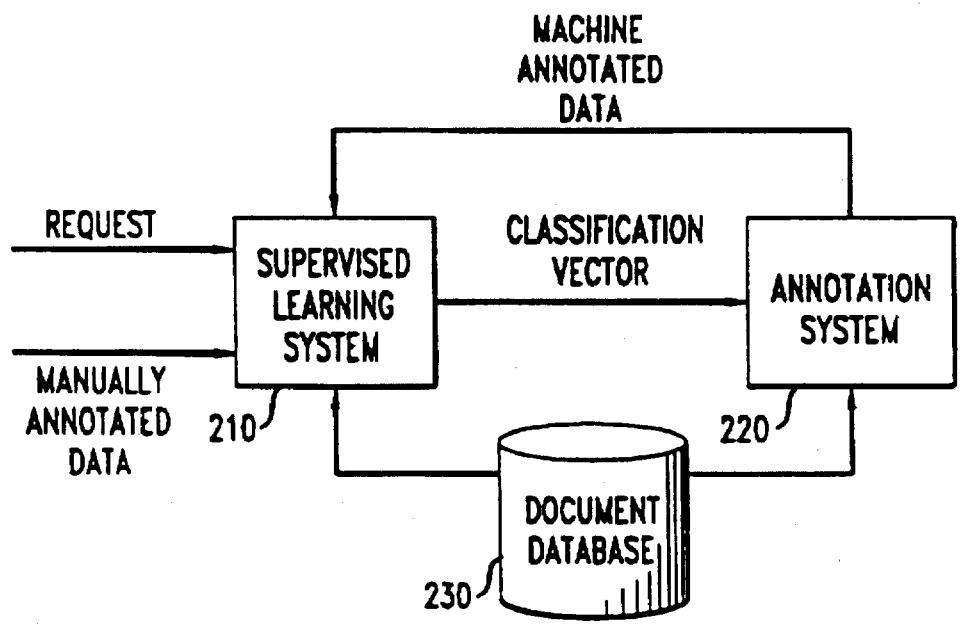
FIG. 2 is a block diagram of an overview of the components of the present invention.
Figure 3:
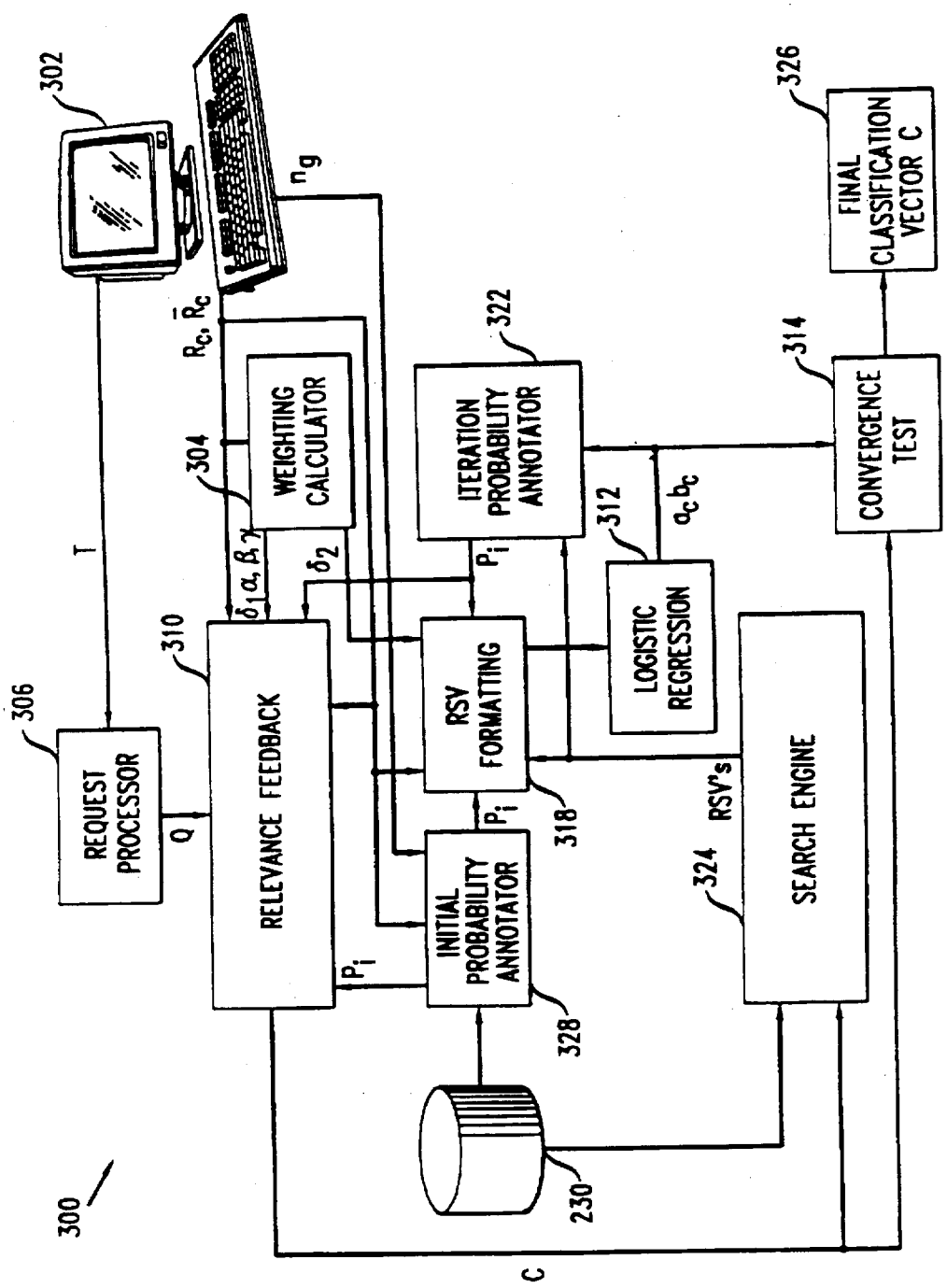
FIG. 3 is a block diagram showing the components of an embodiment of the invention.

FIGS. 2 and 3 are block diagrams of components of the present invention, and will be discussed in further detail below. It will be understood by those skilled in the art that the components of the present invention as shown in FIGS. 2 and 3 may advantageously be implemented using an appropriately programmed digital computer as shown in FIG. 1.

2. Vector Space Model of Text Retrieval

For purposes of this description, it is assumed that the classifier being trained uses the vector space model of text retrieval. The details of the vector space model of text retrieval are described in: Salton, *Automatic Text Processing: The Transformation, Analysis, and Retrieval of Information by Computer*, Addison-Wesley Publishing, 1989.

2.1 Document Representation

In text retrieval systems which use the vector space model of text retrieval, documents are represented as vectors of numeric weights with one weight for each indexing term. Indexing terms are a defined set of terms which are used to describe the documents. An example will illustrate this. Consider a vector space representation which uses 5 indexing terms to describe documents: $T_1, T_2, T_3, T_4$ and $T_5$. Each document in the collection may be represented by a vector containing 5 numeric weights. Each weight is associated with one of the indexing terms, and represents the weight of the associated term in the document. For example, consider a system in which the indexing terms are as follows:

$T_1$: DOCUMENT
$T_2$: TEXT
$T_3$: QUERY
$T_4$: DOG
$T_5$: SUN

Consider the following document D.

D={Text retrieval systems attempt to separate documents from a text database into two groups: those which are relevant to a user query and those which are not}

The vector which represents this document may be <1,2,1,0,0>. The first weight represents the weight of the $T_1$ term, the second weight represents the weight of the $T_2$ term, the third weight represents the weight of the $T_3$ term, the fourth weight represents the weight of the $T_4$ term, and the fifth weight represents the weight of the $T_5$ term. Note that the particular values in the vector representing the document may vary depending on the particular vector space weighting formula being used.

More generally, if d indexing terms are being used to represent documents, then the representation of the i'th document in the document database 230 would be:

$$i, <w_{i1} \ldots w_{ik} \ldots w_{id}>$$

where the identifier i indicates this is the ith document, and where $w_{ik}$ is the weight of the kth term in the ith document. Methods for computing these weights from the raw text of documents are disclosed in the Salton reference cited above describing the vector space model. The indexing terms may be words, as in the example above, or may be other content identifiers, such as citations, author names, publication dates, formatted data, etc. as disclosed in Edward Fox, Gary Nunn, and Whay Lee, "Coefficients for Combining Concept Classes in a Collection," in 11th *International Conferences on Research and Development in Information Retrieval*, pp. 291–307, Grenoble, France, Jun. 13–15, 1988.

2.2 Representation of Classification Vector

A classifier based upon the vector space model of text retrieval uses a classification vector, c, to classify documents. The classification vector, c, is represented in a manner similar to documents. The classification vector c is a vector of numeric weights with one weight for each indexing term:

$$<w_{c1} \ldots w_{ck} \ldots w_{cd}>$$

In this representation $w_{ck}$ represents the weight of the kth term in the classifier vector c. The c subscript identifies the weight term as a weight in the classification vector.

2.3 Document Classification

The classification vector c is used to rank the documents in a collection as follows. The classification vector c is applied to a document to calculate a retrieval status value (RSV) for the document. The RSV of a document is computed according to the following equation:

$$RSV = \sum_{k=1}^{d} w_{ck} \times w_{ik}$$

Thus, each weight term in the classifier vector $W_{ck}$ is multiplied by the corresponding weight term in the document vector $W_{ik}$. The sum of these multiplied weights gives a retrieval status value RSV, which represents the rank of the classified document. The higher the RSV, the more likely that the document falls within the class of documents represented by the classification vector c.

3. Invention Overview

A block diagram illustrating a system for training a classifier in accordance with the present invention is shown in FIG. 2. FIG. 2 shows a high level overview of the components of the system. The detailed operation of the system is described in further detail below. A system 200 for training a classifier includes a supervised learning system 210, an automatic annotation system 220, and a document database 230. The supervised learning system 210 initially receives a user request and/or manually annotated training data, which define a class of documents of interest to a user, and which are used to produce a classification vector c. This classification vector c can be used to classify documents in the database 230 with respect to a class of interest. The remainder of this detailed description will generally be directed to two classes of documents: those relevant to a particular user and those not relevant to that user, although the present invention is not limited to such classes.

The classification vector c produced by the supervised learning system 210 is input to the annotation system 220. The annotation system 220 classifies the documents in the database 230 using the classification vector c and automatically annotates the documents to produce machine annotated data. The machine annotated data produced by the annotation system 220 is used as input to the supervised learning system 210 during subsequent iterations in order to produce a new classification vector c based upon both 1) the machine annotated data, and 2) the manually annotated data and/or user request. This procedure continues until a classification vector c of acceptable accuracy is produced. Thus, the supervised learning system 210 is capable of receiving machine annotated data from the annotation system 220 as well as manually annotated data from a user. Such a configuration provides for a system 200 which performs a combination of supervised (from a user request and/or manually annotated data) and unsupervised (from machine annotated data) learning.

An embodiment of the present invention is shown as the system 300 in FIG. 3. In the embodiment shown in FIG. 3, the supervised learning system 210 includes a relevance feedback module 310 and a logistic regression module 312. The annotation system 220 includes an RSV formatting module 318, a search engine 324, an initial probability annotator 328, and an iteration probability annotator 322. These components will be described in further detail below.

4. Operation of One Embodiment

Figure 4:
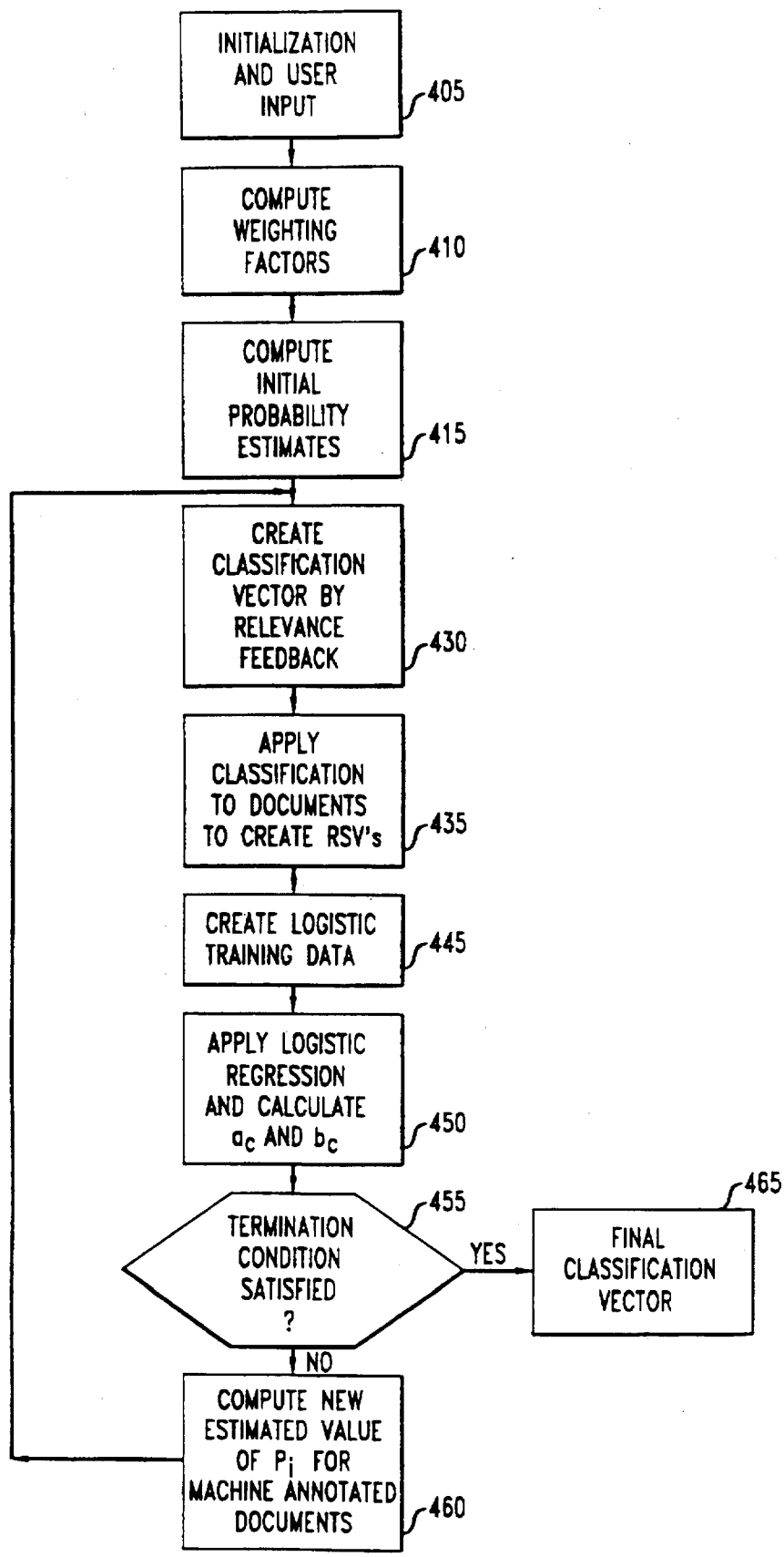
FIG. 4 is a flow diagram of the operation of the invention.

The operation of the embodiment shown in FIG. 3 is described in conjunction with the flow diagram of FIG. 4.

4.1 Initialization and User Input

Initialization and user input to the system 300 occur in step 405. User input to the system 300 is represented as computer input/output device 302. Four kinds of inputs may be provided by the user: manually annotated documents, a user request, weighting factors, and an estimate of the number of relevant documents (each of these inputs is described in further detail in sections 4.1.1–4.1.4 below). The first two inputs are required while the second two inputs are optional.

4.1.1 Manually Annotated Documents

A user may manually annotate a number of documents from the document database 230 as either belonging to the set of relevant documents or not belonging to the set of relevant documents (i.e. relevant or not relevant). Thus, it is assumed that, prior to operation of the system 300, the user has reviewed at least some of the documents in the database 230 and has made a determination as to the relevance of at least one of the documents. The documents to be annotated may have been found as the result of a prior query in which a text retrieval system returned documents, by browsing the documents, or by other means. Let $R_c$ represent a set of identifiers for documents that have been manually annotated as being relevant, and $|R_c|$ represent the number of such documents. Similarly, $\overline{R}_c$ represents a set of identifiers for documents that have been manually annotated as being not relevant, and $|\overline{R}_c|$ represents the number of such documents. Thus $|R_c|+|\overline{R}_c|$ is the number of documents which have been manually annotated. Note that from document database 230 and sets $R_c$ and $\overline{R}_c$, the set of documents that have not been manually annotated can be determined. By comparing the sets $R_c$ and $\overline{R}_c$ with the document database 230, the set U can be determined, where U represents a set of identifiers of documents which are in the database 230 but which have not been manually annotated. $|U|$ represents the number of such documents. These documents identified by the set U are also referred to as non-manually-annotated documents.

4.1.2 User Request

User input 302 also consists of a request T which specifies words and possibly other attributes the user believes are likely to occur in the relevant documents. This request T is provided to a request processor 306, which converts the request T into a query Q, which is a vector of numeric weights in accordance with the vector space model of text retrieval. A query vector is represented as:

$$Q = <w_{r1} \ldots w_{rk} \ldots w_{rd}>$$

$w_{rk}$ represents the weight of the kth term in the query vector Q. The r subscript identifies the weight term as a weight in the query vector. Methods for converting a textual request T into a query Q are the same as for converting a document into a vector of numeric weights, and are well known in the art as described above.

4.1.3 Weighting Factors

In step 410 five weighting factors are computed: $\delta_1, \delta_2, \alpha, \beta$, and $\gamma$. The first two weighting factors $\delta_1$ and $\delta_2$ control how much weight is given to the machine annotated data (described in detail below) relative to the weight given to the manually annotated data. A weighting calculator 304 receives $R_c$ and $\overline{R}_c$ from user input 302 and calculates the weighting factors $\delta_1$ and $\delta_2$, where $\delta_1$ is the weighting factor used during the relevance feedback phase, and $\delta_2$ is the weighting factor used during the logistic regression phase, both of which will be described in further detail below. Both $\delta_1$ and $\delta_2$ are set to $$\delta_1 = \delta_2 = \frac{|R_c| + |\overline{R}_c| + |Q|}{|U|}$$

where $|Q|$ is 1 if the user entered a request T and 0 if the user did not enter a request T. (The situation in which a user does not enter a request T is discussed in further detail below.) This makes the total impact of the machine annotated data roughly equal to the impact of the manually annotated data.

The factors $\alpha$, $\beta$, and $\gamma$ are also set by the weighing calculator 304. $\alpha$ controls how much weight the initial request T has during formation of the classification vector c as discussed in further detail in section 4.2.1 below. $\beta$ and $\gamma$ control how much weight to give relevant and non-relevant documents, respectively, during classification vector formation. These relevant and non-relevant documents may be documents that were manually annotated, or documents which were machine annotated. Reasonable values for these parameters are $\alpha=8$, $\beta=16$, and $\gamma=4$, based on the discussion of the setting of these parameters in Chris Buckley, Gerard Salton, and James Allan, "The Effect Of Adding Relevance Information In A Relevance Feedback Environment", in W. Bruce Croft and C. J. van Rijsbergen, editors, SIGIR 94: *Proceedings of the Seventeenth Annual International ACM-SIGIR Conference on Research and Development in Information Retrieval*, pages 292–300, London, 1994, Springer-Verlag.

For any particular application, tuning of these five factors may lead to better results, and thus, in an alternate embodiment, a mechanism may be provided to allow the user to bypass the weighting calculator 304 and manually enter the values of $\delta_1, \delta_2, \alpha, \beta$, and $\gamma$.

4.1.4 Initial Annotation of Documents with Probability Estimates

For each document i in the database 230, an initial probability annotator 328 annotates the document with an initial degree of relevance estimate which represents the degree to which document i belongs to the class of relevant documents. In one embodiment, this degree of relevance is the probability, $P_i$, that document belongs to the class of relevant documents. The initial $P_i$ is computed in step 415 as follows.

For each document identified by the set $R_c$, the set of documents manually annotated as relevant, $P_i$ is set to 1.0. Thus, a manual annotation of relevance is represented as a $P_i$ value of 1.0. For each document identified by the set $\overline{R}_c$, the set of documents manually annotated as not relevant, $P_i$ is set to 0.0. Thus, a manual annotation of nonrelevance is represented as a $P_i$ value of 0.0. These probabilities which are determined by manual annotation of the documents will not change during processing since the user has made the determination of relevance or non-relevance.

For the remaining non-manually-annotated documents identified by the set U, an initial machine annotation with probability estimates is made as follows. The user estimates $n_g$, the number of documents in the set U of non-manually annotated documents which belong to the class of relevant documents, where $0 < n_g < |U|$. If the user has no such estimate, then a value of $n_g=1$ can be used. Each document i identified by the set U, is annotated with an initial $P_i$ where $$p_i = \frac{n_g}{|U|}.$$

This captures the user's estimate as to the number of relevant documents in the non-manually annotated data, as well as representing the initial ignorance as to which of these documents are relevant. These automatic initial $P_i$ annotations will change during processing.

4.2 Classification Vector Formation

The algorithm for producing a classification vector c in one embodiment is based on the Rocchio algorithm for relevance feedback, which is well known in the art and is disclosed in Salton, *Automatic Text Processing: The Transformation, Analysis, and Retrieval of Information by Computer*, Addison-Wesley Publishing, 1989; and in Harman, Chapter 11 of *Information Retrieval: Data Structures and Algorithms*, Prentice-Hall Publishing, 1992. The algorithm for classification vector formation is as follows.

4.2.1 Construction of Classification Vector by Relevance Feedback Module

The classification vector c is constructed by the relevance feedback module 310 in step 430. The relevance feedback module 310 has the following inputs:

a. The weighting factors $\delta_1$, $\alpha$, $\beta$, and $\gamma$ from the weighting calculator 304;

b. The query vector $Q = <w_{r1} \ldots w_{rk} \ldots w_{rd}>$ from the request processor 306.

c. The document vectors from the database 230 where each document i is represented by the identifier i and a vector, $<w_{i1} \ldots w_{ik} \ldots w_{id}>$ d. The set $R_c$ specifying the identifiers of documents which have been manually annotated as being relevant, and the set $\overline{R}_c$ specifying the identifiers of documents which have been manually annotated as being nonrelevant, from user input 302.

e. For each non-manually annotated document identified by the set U, the probability of relevance $P_i$ of the document from the initial probability annotator 328 during the initial iteration, and from the iteration probability annotator 322 (described in further detail below) during subsequent iterations.

The constructed classification vector c is a vector $$c = <w_{c1} \ldots w_{ck} \ldots w_{cd}>$$

where $$w_{ck} = \begin{cases} w'_{ck} & \text{if } w'_{ck} > 0 \\ 0 & \text{otherwise} \end{cases}$$

according to the equation:

$$w'_{ck} = \alpha w_{rk} + \beta \frac{1}{|R_c|} \sum_{i \in R_c} w_{ik} - \gamma \frac{1}{|\overline{R}_c|} \sum_{i \in \overline{R}_c} w_{ik} +$$

$$\beta \delta_1 \frac{1}{n_{uc}} \sum_{i \in U} p_i \times w_{ik} + \gamma \delta_1 \frac{1}{|U| - n_{uc}} \sum_{i \in U} (1 - p_i) \times w_{ik}$$

where $n_{uc} = \sum_{i \in U} p_i$

The first three elements of the right side of the above equation are the same as the elements of the Rocchio formula for classification vector construction in relevance feedback. The first element $\alpha w_{rk}$ increases the weight of the kth indexing term in the classification vector c in proportion to the weight the term has in the query vector. The factor $\alpha$ controls how much influence the weight of the term in the query has on the final weight of the term in the classification vector c.

The second element $$\beta \frac{1}{|R_c|} \sum_{i \in R_c} w_{ik}$$

increases the weight of the kth indexing term in the classification vector c in proportion to the average weight of the term in the documents which were manually annotated as relevant. First, the sum of the weights of the kth term across the set of manually annotated relevant documents ($R_c$) is calculated. Next, the average weight of the kth term in the manually annotated relevant documents is calculated by multiplying by $$\frac{1}{|R_c|}.$$

Finally, the average weight is multiplied by $\beta$, which controls how much impact the average weight of the term in the manually annotated relevant documents has on the weight of the term in the classification vector.

The third element $$\gamma \frac{1}{|\overline{R}_c|} \sum_{i \in \overline{R}_c} w_{ik}$$

decreases the weight of the kth indexing term in the classification vector c in proportion to the average weight of the term in the documents which were manually annotated as not relevant. First, the sum of the weights of the kth term across the set of manually annotated nonrelevant documents ($\overline{R}_c$) is calculated. Next, the average weight of the kth term in the manually annotated nonrelevant documents is calculated by multiplying by $$\frac{1}{|\overline{R}_c|}.$$

Finally, the average weight is multiplied by $\gamma$, which controls how much impact the average weight of the term in the manually annotated nonrelevant documents has on the weight of the term in the classification vector The last two elements $$\beta \delta_1 \frac{1}{n_{uc}} \sum_{i \in U} p_i \times w_{ik}$$

and $$\gamma \delta_1 \frac{1}{|U| - n_{uc}} \sum_{i \in U} (1 - p_i) \times w_{ik}$$

modify the Rocchio formula by taking into account, for each non-manually-annotated document identified by the set U, the degree to which it is believed that it is relevant ($P_i$) and the degree to which it is believed to be nonrelevant ($1-P_i$). The factor $\delta_1$ controls how much weight is given to the non-manually-annotated documents. The factors $$\frac{1}{n_{uc}} \text{ and } \frac{1}{|U|-n_{uc}}$$

play the same role as $$\frac{1}{|R_c|} \text{ and } \frac{1}{|\overline{R}_c|}$$

in the second and third terms, except that their denominators $n_{uc}$ and $|U|-n_{uc}$ are estimates of the number of relevant and non-relevant documents, respectively, identified by the set U. Thus, each of the machine annotated documents is treated as partially relevant and partially non-relevant, according to its $P_i$ annotation. The fourth term in the equation increases the weight of the kth indexing term in the classification vector c according to the proportional average weight of the term in the machine annotated documents, where the proportion is defined by $P_i$. Similarly, the fifth term in the equation decreases the weight of the kth indexing term in the classification vector c according to the proportional average weight of the term in the machine annotated documents, where the proportion is defined by $(1-P_i)$.

Methods for implementing the Rocchio formula are well known in the art, and described in the Salton and Harman references above. It would be readily apparent to one skilled in the art of text retrieval to implement the above described modifications of the Rocchio formula using similar methods.

Thus, the output of the relevance feedback module 310 is a classification vector c, which is formed by the above equation.

4.3 Operation of the Annotation System 220

The annotation system 220 is then operated to modify the initial $P_i$ annotations which were assigned to the non-manually-annotated documents by the initial probability annotator 328. As discussed above, the annotation system 220 includes the RSV formatting module 318, the search engine 324, the initial probability annotator 328, and the iteration probability annotator 322.

The first phase of the annotation process begins by producing a retrieval status value (RSV) for each document in the database. Then an RSV is produced for the query Q. These RSV's are then used to produce formatted training data.

The second phase of the annotation process passes the formatted data from phase 1 to a logistic regression module 312, producing the parameters of a logistic function.

The third phase of the annotation process applies the logistic function to the RSV's of the non-manually annotated documents, producing a new $P_i$ annotation for each non-manually annotated document.

4.3.1 Operation of Search Engine to Produce Document Retrieval Status Values The classification vector $c=<w_{c1} \ldots w_{ck} \ldots w_{cd}>$ produced by the relevance feedback module 310, along with the document vectors $i=<w_{i1} \ldots w_{ik} \ldots w_{id}>$ from the document database 230, are provided to the search engine 324, which performs the classification function in step 435. The classification vector c is applied to all of the documents, both manually annotated and non-manually annotated, in order to produce a retrieval status value (RSV) for each such document. Thus, an RSV is calculated for each document i, as described above in Section 2.3 A large RSV indicates that the document is more likely to be relevant. Known vector space text retrieval systems include mechanisms for efficiently computing the RSV's for large numbers of documents.

4.3.2 Operation of RSV Formatting Module to Create Logistic Training Data

The search engine 324 provides the calculated RSV's to the RSV formatting module 318. The RSV formatting module 318 also receives the parameter $\delta_2$ from the weighting calculator 304, and the sets of identifiers of manually annotated documents, $R_c$ and $\overline{R}_c$, from user input 302. The RSV formatting module 318 also receives, on the first iteration, the initial probability estimates $P_i$ from initial probability annotator 328. On subsequent iterations, it uses the $P_i$ values computed by the iteration probability annotator 322. In step 445, the RSV formatting module 318 creates logistic training data consisting of triples of numbers as follows.

First, a triple for the query Q is created as:

<RSV$_r$, 1, 1.0> where RSV$_r$ is set to the maximum of all document RSV's received from the search engine 324. The second element of the triple, the integer 1, indicates that the query is considered to belong to the class of relevant documents, and the third element of the triple, the value 1.0, indicates that this triple is to be given a weight of 1 during logistic regression (described in further detail below).

Second, for each document identified by the set $R_c$ (i.e. those which have been manually annotated as belonging to the class of relevant documents), a triple is created as:

<RSV$_i$, 1, 1.0> where RSV$_i$ is the RSV of the manually annotated document as calculated by the search engine 324. The second element of the triple, the integer 1, indicates that the document is considered to belong to the class of relevant documents, and the third element of the triple, the value 1.0, indicates that this triple is to be given a weight of 1 during logistic regression.

Third, for each document identified by the set $\overline{R}_c$ (i.e., those that have been manually annotated as not belonging to the class of relevant documents), a triple is created as:

<RSV$_i$, 0, 1.0> where RSV$_i$ is the RSV of the manually annotated document as calculated by the search engine 324. The second element of the triple, the integer 0, indicates that the document is considered to not belong to the class of relevant documents, and the third element of the triple, the value 1.0, indicates that this triple is to be given a weight of 1 during logistic regression.

Fourth, for each non-manually annotated document identified by the set U, two triples are created:

<RSV$_i$,1,$p_i \times \delta_2$>  (1)

<RSV$_i$,0,(1-$p_i$)$\times \delta_2$>  (2)

In the triple (1) above, RSV$_i$ is the RSV of the document as calculated by the search engine 324. The second element of the triple, the integer 1, indicates that the document is considered to belong to the class of relevant documents. During the first iteration, the factor $P_i$ is the probability of relevance calculated by the initial probability annotator 328, and is used as a weighting factor such that the weight given to document i, when treating it as a relevant document, will be proportional to the current estimate of the probability that the document is relevant. During subsequent iterations, the factor $P_i$ is the probability of relevance calculated by the iteration probability annotator 322. The $\delta_2$ parameter controls how much weight the logistic training data representing the non-manually annotated documents is given during logistic regression (as described below). In the triple (2) above, $RSV_i$ is the RSV of the machine annotated document as calculated by the search engine 324. The second element of the triple, the integer 0, indicates that the document is considered not to belong to the class of relevant documents. The factor $1-P_i$ is used as a weighting factor such that the weight given to document i, when treating it as a non-relevant document, will be proportional to the current estimate of the probability that the document is a member of the class of non-relevant documents. $\delta_2$ serves the same function as in triple (1).

4.4 Construction of the Logistic Parameters

The logistic training data created by the RSV formatting module 318 is provided to a logistic regression module 312. The logistic regression module 312 calculates parameters $a_c$ and $b_c$ from the received logistic training data in step 450. These parameters $a_c$ and $b_c$ will be used as input to the iteration probability annotator 322 (described below in conjunction with step 460). The logistic regression module 312 will choose parameters $a_c$ and $b_c$ such that the iteration probability annotator 322, when provided with the RSV's of the non-manually annotated documents, will calculate estimates of $P_i$ for the non-manually annotated documents. Techniques for performing logistic regression are well known in the art. For details, see A. Agresti, "Categorical Data Analysis," John Wiley, New York, 1990, and P. McCullagh and J. Nelder, "Generalized Linear Models," Chapman & Hall, London, 2nd edition, 1989. Logistic regression is also a capability in commercially available statistics packages such as SPSS from SPSS, Inc. of Chicago, Ill.

4.5 Test for Convergence

The classification vector c produced by the relevance feedback module 310 along with the parameters $a_c$ and $b_c$ calculated by the logistic regression module 312, are provided to a convergence test module 314. In step 455 the convergence test module 314 tests for a termination condition to determine if a satisfactory classification vector c has been produced. This test will only be made during the second, and each subsequent, time that step 455 is reached. Different termination conditions may be used depending upon the specific application and user requirements. For example, the classification vector c, and the parameters $a_c$ and $b_c$, found on the particular iteration may be compared with the values from the prior iteration. If the values are sufficiently close, then the termination condition is satisfied. Alternatively, the procedure can be executed for some fixed number of iterations. When the chosen termination condition is reached, the result is the classification vector c, as represented by 326 in FIG. 3 and 465 in FIG. 4. At this point, the classification vector c may be used, for example, to categorize or retrieve documents from a database of documents. If the chosen termination condition is not satisfied, then the procedure continues with step 460.

4.6 Re-Estimation of Probability of Relevance for Non-Manually-Annotated Documents Continuing with step 460, the parameters $a_c$ and $b_c$ computed by the logistic regression module 312, and the RSV values of the non-manually annotated documents from the search engine 324, are provided to the iteration probability annotator 322. The iteration probability annotator 322 annotates each of the non-manually-annotated documents with a new estimated value of $P_i$ according to the following formula:

$$p_i = \frac{e^{(a_c + b_c \times RSV_i)}}{1 + e^{(a_c + b_c \times RSV_i)}}$$

Steps 430 through 460 are then repeated as follows.

4.7 Operation of the Invention for Multiple Iterations

When control reaches step 430 on the second and each successive pass, the relevance feedback module 310 receives the new estimated values of $P_i$ from the iteration probability annotator 322 instead of the initial estimated values of $P_i$ calculated by the initial probability annotator 328, and uses these new estimated values of $P_i$ when forming the classification vector c. This is the case for each successive time step 430 is reached.

Similarly, when control reaches step 445 on the second and each successive pass, the RSV formatting module 318 uses the new estimated values of $P_i$ received from the iteration probability annotator 322 instead of the initial estimated values of $P_i$ calculated in the initial probability estimator 328, when creating the logistic training data. This is the case for each successive time step 445 is reached.

4.8 Alternate Embodiment Varying User Inputs

In the embodiment described above, it was assumed that the user provided a request T, documents manually annotated as relevant, and documents manually annotated as not relevant. In an alternate embodiment, the system 300 can operate to produce a classification vector c in the absence of either a user entered request or manually annotated documents. If no user request is entered, the first term of the equation described in Section 4.2.1 may be dropped. If no documents have been annotated as being class members, the second term of the equation as described in section 4.2.1 may be dropped. If no documents have been annotated as not being class members, the third term of the equation described in Section 4.2.1 may be dropped. However, for the resulting classification vector c to have reasonable effectiveness, either a user request or at least one document manually annotated as being a class member is required. Such a modification to the preferred embodiment could be readily implemented by one skilled in the art given the above disclosure.

5. Conclusion

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the present invention has been described using the two classes relevant and non-relevant. However, the present invention is not limited to these two classes. In addition, the invention may be readily extended to apply to problems involving more than two classes, for instance by treating a problem involving n classes as n binary classification problems. Further, an embodiment of the invention may use a model of text retrieval other than the vector space model, and a supervised learning method other than the Rocchio algorithm.

I claim:

1. A method for training a classifier to classify at least one document which has not been manually annotated with respect to a defined class;

performing an operation on data including a retrieval status value associated with the document to generate at least one parameter value;

calculating a degree of relevance representing the degree to which said document belongs to said defined class, said degree of relevance being a function of at least the retrieval status value and the parameter value; and training said classifier using said degree of relevance.

2. The method of claim 1 further comprising the steps of:

automatically annotating said at least one document with said calculated degree of relevance to produce at least one automatically annotated document; and wherein said step of training said classifier further comprises the step of training said classifier using said at least one automatically annotated document.

3. The method of claim 2 wherein said step of training said classifier using said at least one automatically annotated document further comprises the step of:

performing a relevance feedback function using said at least one automatically annotated document to produce a classification vector.

4. The method of claim 1 wherein said defined class is defined by a request.

5. The method of claim 1 wherein said defined class is defined by at least one manually annotated document.

6. The method of claim 1 wherein said defined class is defined by both a request and at least one manually annotated document.

7. The method of claim 1 wherein said degree of relevance is proportional to an estimate of the probability of said at least one document in said first set being relevant to said defined class.

8. The method of claim 1 wherein the operation includes logistic regression.

9. The method of claim 1 wherein the data includes logistic training data.

10. The method of claim 1 wherein the parameter value includes a value of a logistic parameter.

11. A method for producing a classification vector for use in classifying at least one non-manually annotated document with respect to a defined class, said method comprising the steps of:

performing an operation on data including a retrieval status value associated with the document to generate at least one parameter value;

calculating a degree of relevance representing the degree to which said non-manually annotated document belongs to the defined class, said degree of relevance being a function of at least the retrieval status value and the parameter value;

automatically annotating said non-manually annotated document with said degree of relevance to produce a machine annotated document; and performing a relevance feedback function using said machine annotated document.

12. The method of claim 11 wherein said step of calculating a degree of relevance further comprises the step of:

calculating an estimate of the probability that said non-manually annotated document belongs to the defined class.

13. The method of claim 11 wherein said step of performing a relevance feedback function further comprises the step of:

performing the relevance feedback function using a manually annotated document.

14. The method of claim 11 wherein the operation includes logistic regression.

15. The method of claim 11 wherein the data includes logistic training data.

16. The method of claim 11 wherein the parameter value includes a value of a logistic parameter.

17. An apparatus for training a classifier to classify at least one document which has not been manually annotated with respect to a defined class, said apparatus comprising:

an operating processor for performing an operation on data including a retrieval status value associated with the document to generate at least one parameter value;

an annotation processor for automatically annotating the document to produce at least one automatically annotated document, said annotation including a degree of relevance representing the degree to which said at least one automatically annotated document belongs to said defined class, said degree of relevance being a function of at least the retrieval status value and the parameter value; and a supervised learning processor for training the classifier using said at least one automatically annotated document.

18. The system of claim 17 wherein said defined class is defined by a request.

19. The system of claim 17 wherein said supervised learning system further comprises:

a relevance feedback module.

20. The system of claim 17 wherein said annotation system further comprises:

classification means for calculating a retrieval status value for said at least one document; and means responsive to said classification means for calculating said degree of relevance for said at least one document.

21. The apparatus of claim 17 wherein the operation includes logistic regression.

22. The apparatus of claim 17 wherein the data includes logistic training data.

23. The apparatus of claim 17 wherein the parameter value includes a value of a logistic parameter.

24. An apparatus for training a classifier to classify at least one document which has not been manually annotated with respect to a defined class, said apparatus comprising:

means for performing an operation on data including a retrieval status value associated with the document to generate at least one parameter value;

means for calculating a degree of relevance representing the degree to which the document belongs to said defined class, said degree of relevance being a function of at least the retrieval status value and the parameter value; and means for training the classifier using said degree of relevance.

25. The apparatus of claim 24 further comprising:

annotation means for automatically annotating said at least one document with said calculated degree of relevance to produce at least one automatically annotated document; and wherein said means for training the classifier comprises a relevance feedback mechanism responsive to said annotation means for producing a classification vector.

26. The apparatus of claim 24 wherein said degree of relevance is proportional to an estimate of the probability of said at least one document being relevant to said defined class.

27. The apparatus of claim 24 wherein the operation includes logistic regression.

28. The apparatus of claim 24 wherein the data includes logistic training data.

29. The apparatus of claim 15 wherein the parameter value includes a value of a logistic parameter.

* * * * *